(12) United States Patent
Kato et al.

(10) Patent No.: US 10,983,742 B2
(45) Date of Patent: Apr. 20, 2021

(54) IMAGE FORMING APPARATUS HAVING ITEMS RELATED TO FUNCTION CONTROL

(71) Applicant: KYOCERA Document Solutions Inc., Osaka (JP)

(72) Inventors: Yusuke Kato, Osaka (JP); Muneki Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/800,603

(22) Filed: Feb. 25, 2020

(65) Prior Publication Data

US 2020/0272392 A1 Aug. 27, 2020

(30) Foreign Application Priority Data

Feb. 27, 2019 (JP) .............................. JP2019-034337

(51) Int. Cl.
*G06F 3/12* (2006.01)
(52) U.S. Cl.
CPC .......... *G06F 3/1273* (2013.01); *G06F 3/1204* (2013.01); *G06F 3/1258* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2005/0117918 A1* | 6/2005 | Kimura .............. | G03G 21/1878 399/8 |
| 2015/0077784 A1* | 3/2015 | Fukushima ........... | G06F 3/1231 358/1.13 |
| 2019/0266456 A1* | 8/2019 | Yokomizo ............. | G06F 3/1204 |

FOREIGN PATENT DOCUMENTS

JP 2006256056 A 9/2006

* cited by examiner

*Primary Examiner* — Miya J Williams
(74) *Attorney, Agent, or Firm* — Studebaker & Brackett PC (57) ABSTRACT

An image forming apparatus according to the present disclosure has items relating to function control. The image forming apparatus includes a setting section and a classification section. The setting section sets item content for each function. The classification section classifies an item into a first item group depending on a change frequency of the item contents. The first item group is defined such that information indicating a change in item content of the group is sent to an external device.

10 Claims, 9 Drawing Sheets

| Item A | | | |
|---|---|---|---|
| Specified period | Change content | Change count (times) | Change frequency (arithmetic average value) (times) |
| January | ① a → b<br>② b → c<br>③ c → d | 3 | — |
| February | ④ d → e<br>⑤ e → f<br>⑥ f → a | 3 | 3 |
| March | — | 0 | 2 |

FIG. 9

IMAGE FORMING APPARATUS HAVING ITEMS RELATED TO FUNCTION CONTROL

INCORPORATION BY REFERENCE

The present application claims priority under 35 U.S.C. § 119 to Japanese Patent Application No. 2019-034337, filed on Feb. 27, 2019. The contents of this application are incorporated herein by reference in their entirety.

BACKGROUND

The present disclosure relates to an image forming apparatus.

Generally, an image forming apparatus is known to provide one or more functions (for example, a printing function, a copy function, and a scanner function) to a user and be configured to allow the user to set, in each of items related to one or more functions, corresponding item content. Each of the items is provided with pieces of item content that can be selected by the user.

Meanwhile, an image forming apparatus is also known to be maintained by a service person. An image forming apparatus as an example of such an image forming apparatus includes non-volatile memory. The image forming apparatus stores in the non-volatile memory maintenance information for the service person to execute maintenance.

SUMMARY

According to an aspect of the present disclosure, an image forming apparatus has items related to function control. The image forming apparatus includes a setting section and a classification section. The setting section sets item contents for each function. The classification section classifies an item into a first item group depending on change frequency of the item content. The first item group is a group defined such that information indicating a change in the item content is sent to an external device.

DETAILED DESCRIPTION

First Embodiment

Figure 1:
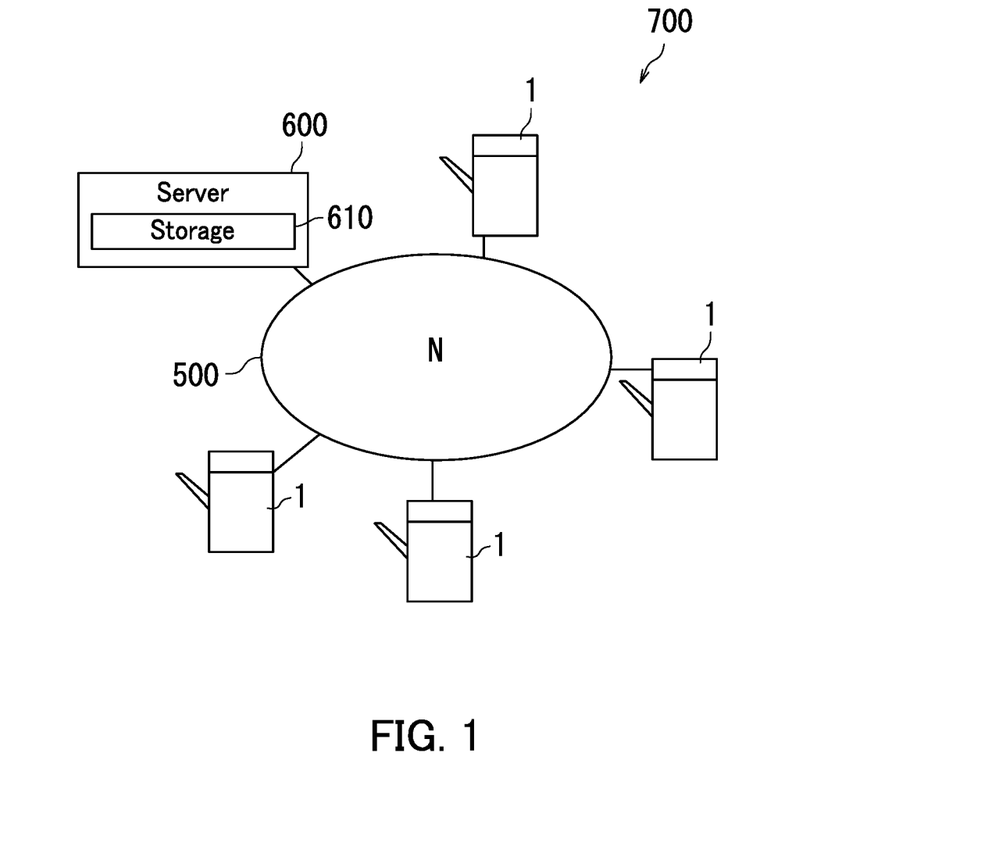
FIG. 1 is a diagram illustrating a configuration of an image forming system according to a first embodiment of the present disclosure.

The following describes a first embodiment of the present disclosure with reference to drawings. FIG. 1 is a diagram illustrating a configuration of an image forming system 700 according to the first embodiment.

As illustrated in FIG. 1, the image forming system 700 according to the first embodiment includes a plurality of image forming apparatuses 1 and a server 600. The server 600 is an example of an "external device". Each of the image forming apparatuses 1 is located at a company to which each user belongs. The server 600 is located at a service company. The service company is for example a distributor of the image forming apparatuses 1. The service company has a service person belonging thereto.

The server 600 and the image forming apparatuses 1 are connected through an electronic network N. As the electronic network N, a local area network (LAN) or the Internet can be used for example.

The server 600 includes storage 610. The server 600 receives information from each of the image forming apparatuses 1 and stores the information in the storage 610. The information indicates that content of a specified item has been changed in the image forming apparatus 1. Upon the storage 610 storing the information, the service person views the information and visits a site where the image forming apparatus 1 is installed. As a result, the service person can promptly respond to the change in the content of the specified item.

Figure 2:
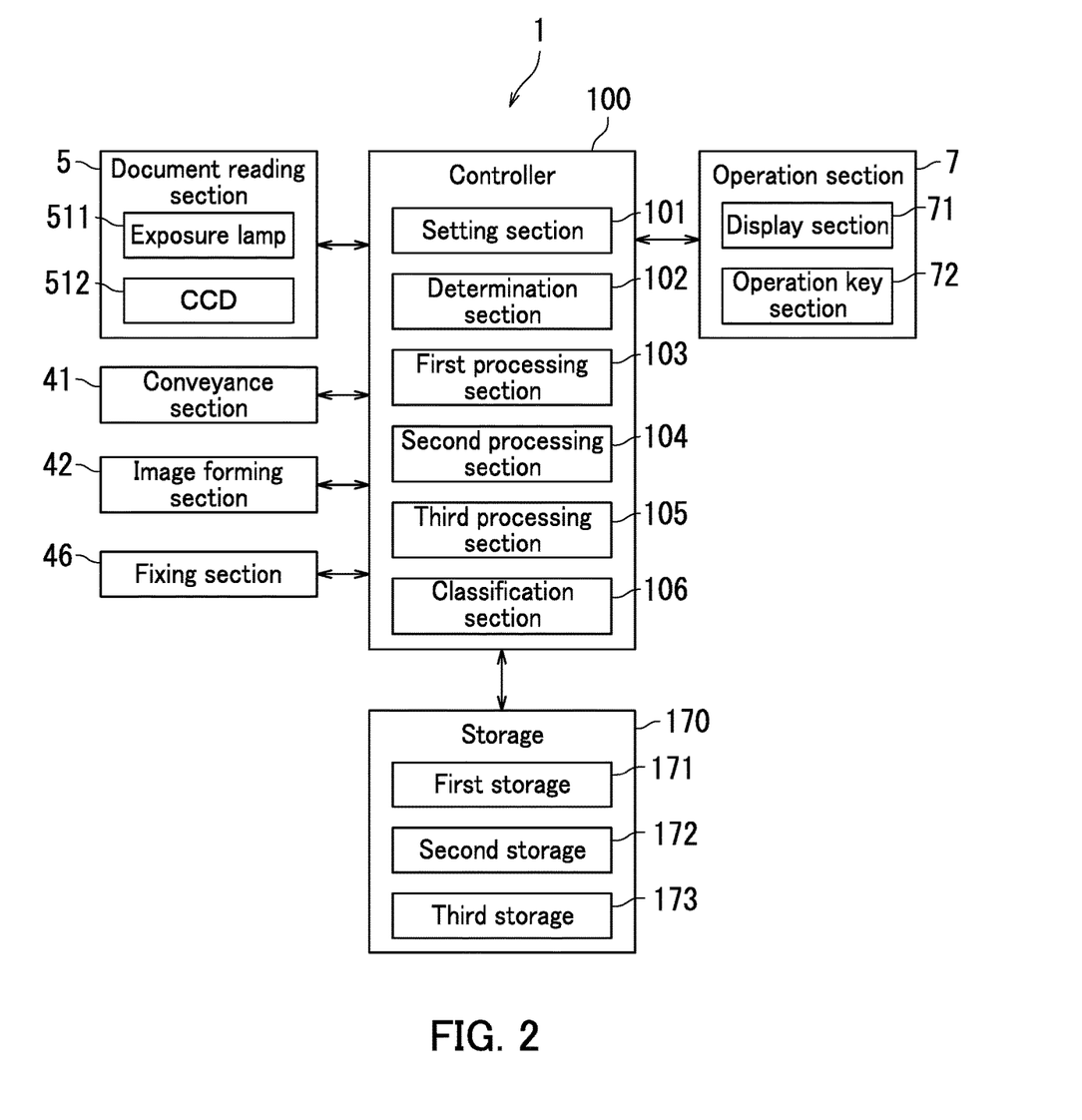
FIG. 2 is a block diagram illustrating a configuration of an image forming apparatus according to the first embodiment.

The image forming apparatus 1 according to the first embodiment will be described with reference to FIG. 2. FIG. 2 is a block diagram illustrating a configuration of the image forming apparatus 1 according to the first embodiment.

As illustrated in FIG. 2, the image forming apparatus 1 is for example a multifunction peripheral. The image forming apparatus 1 provides the user operating the image forming apparatus 1 with one or more functions. Examples of the functions that the image forming apparatus 1 provides to the user include a printing function, a copy function, a scanner function, and a facsimile function.

The image forming apparatus 1 has items related to function control. Specifically, the image forming apparatus 1 has items related to control of each of a plurality of functions. Examples of the plurality of items include laser light intensity in a light exposure section of an image forming section, color selection, and print position setting.

For each item, one of pieces of content is selected by the user. Each content indicates a specific operation corresponding to the item. For example, the content selected in the laser light intensity is a setting value indicating a laser light intensity. As a result, the user can select a laser light intensity by changing the set value in the laser light intensity.

Selectable pieces of content in the color selection are content indicating a full color mode, content indicating a black and white mode, and content indicating an auto color mode. As a result, the user can select a printing mode from the full color mode, the black and white mode, or the auto color mode by changing the content in the color selection. Note that the auto color mode is a mode in which the image forming apparatus 1 determines whether to perform printing in the full color mode or in the black and white mode.

For example, content selected in the print position setting is a setting indicating a print position. As a result, the user can change the print position by changing the set value in the print position setting.

The image forming apparatus 1 includes a document reading section 5, a conveyance section 41, an image forming section 42, a fixing section 46, an operation section 7, a controller 100, and storage 170.

The document reading section 5 reads a document image formed on a document. Specifically, the document reading section 5 includes an exposure lamp 511 and a charge coupled device (CCD) 512. The document reading section 5 outputs acquired image data to the controller 100.

The conveyance section 41 conveys a sheet to the image forming section 42.

The image forming section 42 includes an exposure section, a photosensitive drum, and a developing section. The exposure section outputs a laser beam having an intensity based on the set value in the item "laser beam intensity" to expose the photosensitive drum. The developing section forms a toner image on the photosensitive drum based on the content set in the item "color selection". The transfer section transfers the toner image on the photosensitive drum to the sheet.

The fixing section 46 heats the sheet on which the toner image has been transferred to fix the toner image on the sheet.

The operation section 7 includes a display section 71 and an operation key section 72. The display section 71 includes a liquid crystal display. The display section 71 displays operation guide information of various functions. The display section 71 also functions as a touch panel by which content of various items can be input.

The controller 100 controls the operation of each section of the image forming apparatus 1 by executing a control program. The controller 100 includes a processor such as a central processing unit (CPU). The controller 100 further includes an integrated circuit for image forming processing. The integrated circuit for image forming processing includes for example an application specific integrated circuit (ASIC). The controller 100 includes a setting section 101, a determination section 102, a first processing section 103, a second processing section 104, a third processing section 105, and a classification section 106.

The storage 170 stores the control program. The storage 170 is a storage device or semiconductor memory. The storage device includes for example either or both of a hard disk drive (HDD) and a solid state drive (SSD). Examples of the semiconductor memory include random access memory (RAM) and read only memory (ROM). The storage 170 further includes first storage 171, second storage 172, and third storage 173.

Figure 3:
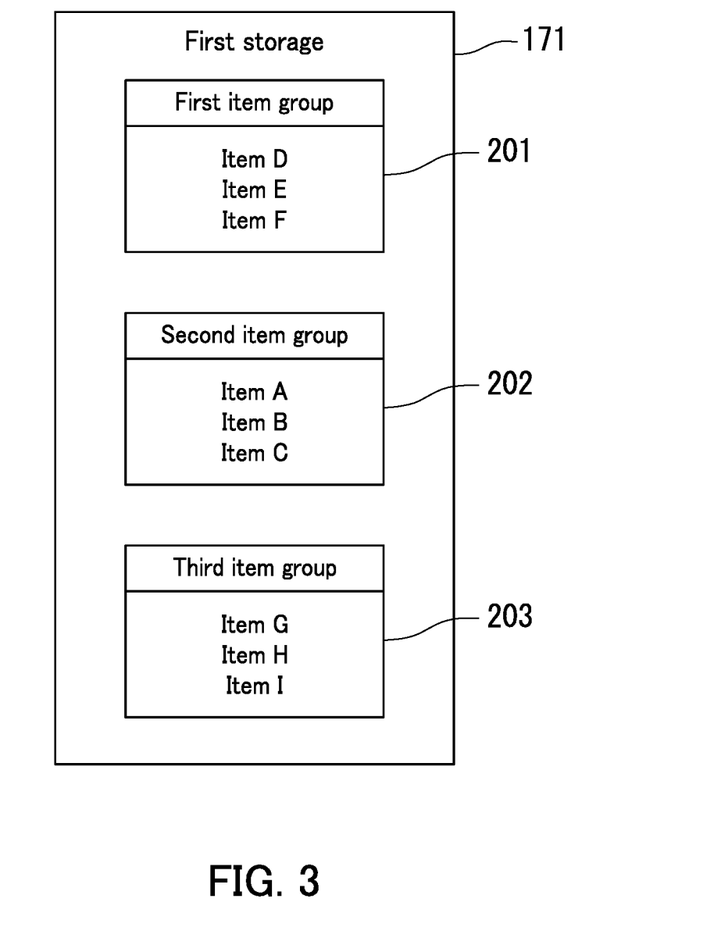
FIG. 3 is a first classification table in which a plurality of items in the first embodiment are classified in a first item group, a second item group, and a third item group.

The first storage 171 will be described with reference to FIG. 3. FIG. 3 is a first classification table in which a plurality of items are classified in a first item group 201, a second item group 202, and a third item group 203.

The first item group 201 is a group defined such that information indicating a change in item content is sent to the server 600. Further, the second item group 202 is a group defined such that information including changed item content is stored in the second storage 172. Further, the third item group 203 is a group defined such that storing information indicating a change in item content in the storage 170 and sending information indicating a change in item content to the server 600 are prevented.

As illustrated in FIG. 3, each of the plurality of items is classified in one of the first item group 201, the second item group 202, and the third item group 203, and stored in the first storage 171. For example, some of the plurality of items are classified in the first item group 201. Specifically, item D, item E, and item F are classified in the first item group 201. Also, some of the plurality of items are classified in the second item group 202. Specifically, item A, item B, and item C are classified in the second item group 202. Further, some of the plurality of items are classified in the third item group 203. Specifically, item G, item H, and item I are classified in the third item group 203.

Figure 4:
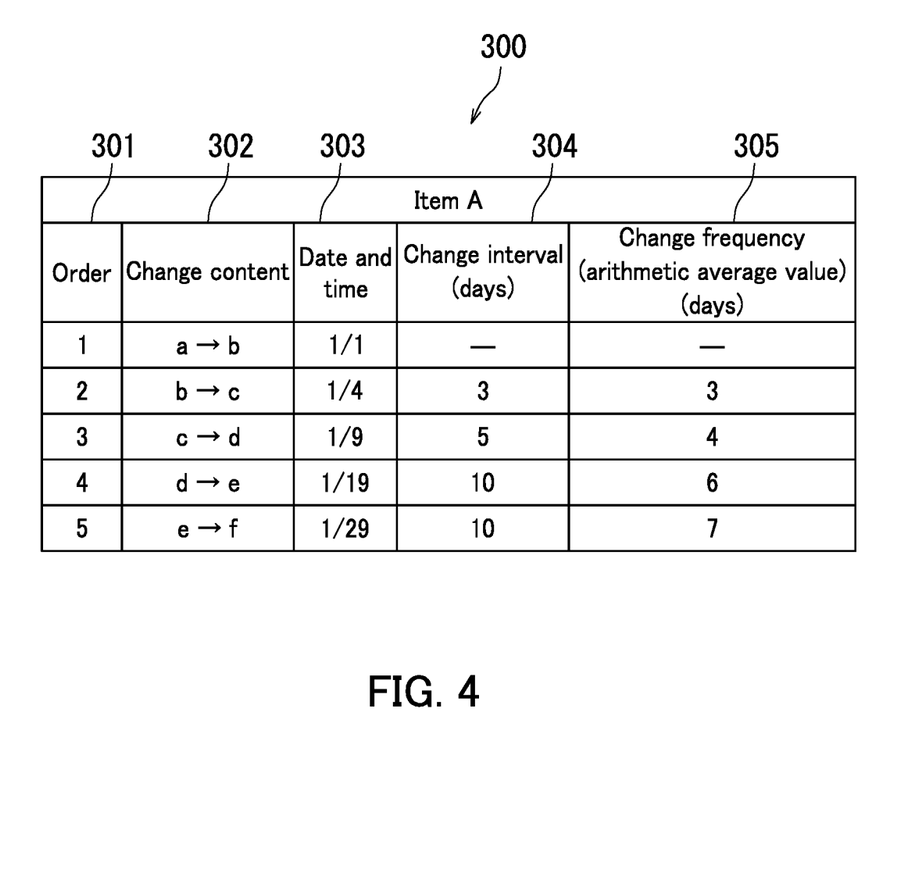
FIG. 4 is a first table including content change history of item A classified in the second item group in the first embodiment.

Next, the items classified in the second item group 202 will be described with reference to FIG. 4. FIG. 4 is a first table 300 including content change history of item A classified in the second item group 202. The second item group 202 includes items that need regular analysis by a service person.

As illustrated in FIG. 4, information including content change history of item A is represented in a table format. The information including content change history of item A includes an order data field 301, a change content data field 302, a date and time data field 303, a change interval data field 304, and a change frequency data field 305. The change interval is an interval between a change made in the item content and the next change. The change frequency is represented by for example an arithmetic average value of change intervals.

The order data field 301 stores data indicating the order in which changes were made in the content of item A.

The change content data field 302 stores data indicating the content before the change and the content after the change. For example, in the first change content data field, data indicating a change from content "a" to content "b" is stored. For example, in the second change content data field, data indicating a change from content "b" to content "c" is stored. Each of "a" to "f" indicates item content different from each other.

The date and time data field 303 stores data indicating the date and time when the content change was made. For example, in the first date and time data field, data indicating "January 1" is stored. In the second date and time data field, data indicating "January 4" is stored.

The change interval data field 304 stores data indicating the change interval. For example, in the second change interval data field, data indicating "3 days" is stored. In the third change interval data field, data indicating "5 days" is stored.

The change frequency data field 305 stores data indicating a change frequency. For example, in the change frequency data field, data indicating an arithmetic average value of change intervals is stored. In the second change frequency data field, data indicating "3 days" is stored. In the third change frequency data field, data indicating "4 days" is stored.

When a change is made in the content of item A, information including the changed content of item A is written into the second storage 172 by the controller 100. Also, for each of items B and C classified in the second item group 202, a first table 300 including change history of the item is created in the second storage 172 as is the case with item A.

Next, the items classified in the first item group 201 will be described. The first item group includes items that do not need regular analysis by a service person but need to inform the user of any disadvantage of changing the item content.

Figure 5:
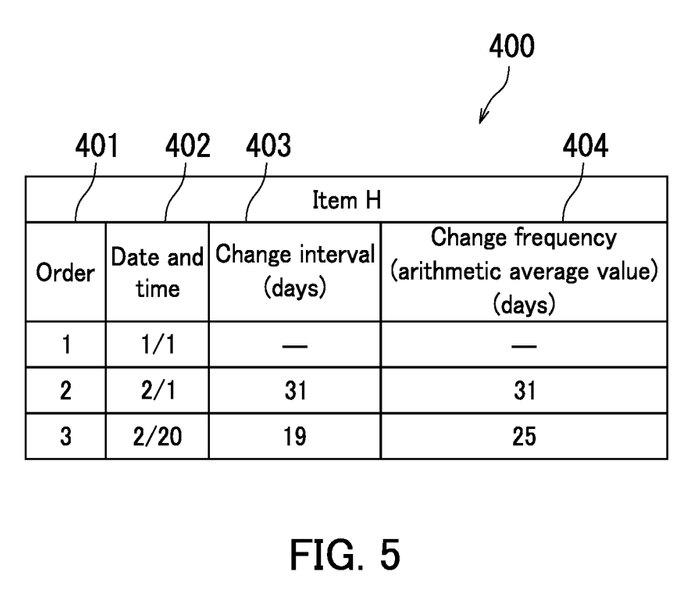
FIG. 5 is a second table including change timing history of item H classified in the third item group in the first embodiment.

Next, the items classified in the third item group 203 will be described with reference to FIG. 5. FIG. 5 is a second table 400 including change timing history of item H classified in a third item group 203. The third item group 203 includes items that do not need regular analysis by a service person.

As illustrated in FIG. 5, information including change timing history of item H is represented in a table format. The information including change timing history of item H includes an order data field 401, a date and time data field 402, a change interval data field 403, and a change frequency data field 404. The change frequency is represented by for example an arithmetic average value of change intervals. That is, the information including change timing history of item H does not include a change content data field.

The order data field 401 stores data indicating an order in which changes were made in the content of item H.

The date and time data field 402 stores data indicating the date and time when the content change was made. For example, in the first date and time data field, data indicating "January 1" is stored. In the second date and time data field, data indicating "February 1" is stored.

The change interval data field 403 stores data indicating the change interval. For example, in the second change interval data field, data indicating "31 days" is stored. In the third change interval data field, data indicating "19 days" is stored.

The change frequency data field 404 stores data indicating a change frequency. For example, in the change frequency data field 404, data indicating an arithmetic average value of change intervals is stored. In the second change frequency data field, data indicating "31 days" is stored. In the third change frequency data field, data indicating "25 days" is stored.

When a change is made in the content of item H, information including change timing history of item H is written into the third storage 173 by the controller 100. Also, for each of items G and I classified in the third item group 203, a second table 400 including change timing history of the item is created in the third storage 173 as is the case with item H.

As illustrated in FIG. 2, the processor of the controller 100 executes the control program stored in the storage 170, thereby functioning as the setting section 101, the determination section 102, the first processing section 103, the second processing section 104, the third processing section 105, and the classification section 106.

The setting section 101 sets item content for each function. For example, the setting section 101 accepts via the operation section 7 an instruction to set content of an item from the user. As a result, the setting section 101 sets item content for each function.

The determination section 102 determines in which of the first item group 201, the second item group 202, and the third item group 203, the item whose content has been changed by the setting section 101 is classified. For example, based on the first classification table stored in the first storage 171, the determination section 102 determines in which of the first item group 201, the second item group 202, and the third item group 203, the item concerned is classified.

Upon content of a specified item classified in the first item group 201 being changed, the first processing section 103 sends information indicating a content change in the specified item to the server 600. For example, when the determination section 102 determines that the item whose content has been changed by the setting section 101 is classified in the first item group 201, the first processing section 103 sends information indicating a content change in the specified item to the server 600. Therefore, according to the first embodiment, the service person accessing the storage 610 of the server 600 can find at a timing of a content change in a specified item in the image forming apparatus 1 that a content change has been made in the specified item. As a result, the service person can promptly respond to the change in the content of the specified item.

Upon content of a specified item classified in the second item group 202 being changed, the second processing section 104 stores information including the changed content of the specified item in the second storage 172. For example, when the determination section 102 determines that the item whose content has been changed by the setting section 101 is classified in the second item group 202, the second processing section 104 stores information including the changed content of the specified item in the second storage 172. As a result, a first table 300 as shown in FIG. 4 is created in the second storage 172. Therefore, a service person who regularly visits a site where the image forming apparatus 1 is installed accesses the second storage 172 at the timing of the regular visit to the installation site of the image forming apparatus 1 to know content change history of specified items. As a result, the service person can analyze content change of the items classified in the second item group 202.

Upon content of a specified item classified in the third item group 203 being changed, the third processing section 105 stores information indicating a change in item content of the specified item in the third storage 173. For example, when the determination section 102 determines that the item whose content has been changed by the setting section 101 is classified in the third item group 203, the third processing section 105 stores information indicating a content change of the specified item in the third storage 173. As a result, a second table 400 as shown in FIG. 5 is created in the third storage 173.

The classification section 106 classifies an item into a first item group 201 depending on change frequency of the item content. For example, the classification section 106 calculates a change frequency based on change intervals. Therefore, according to the first embodiment, the classification section 106 can appropriately calculate the change frequency based on the lengths of change intervals. For example, calculation by the classification section 106 taking a longer change interval into account results in a reduced change frequency. By contrast, calculation by the classification section 106 taking a shorter change interval into account results in an increased change frequency.

The change frequency is preferably represented by an average value of a plurality of change intervals of the item. Therefore, according to the first embodiment, even when there is a prominently long change interval or a prominently short change interval, it is possible to calculate a change frequency that is less affected by the prominently long change interval and the prominently short change interval.

Figure 6:
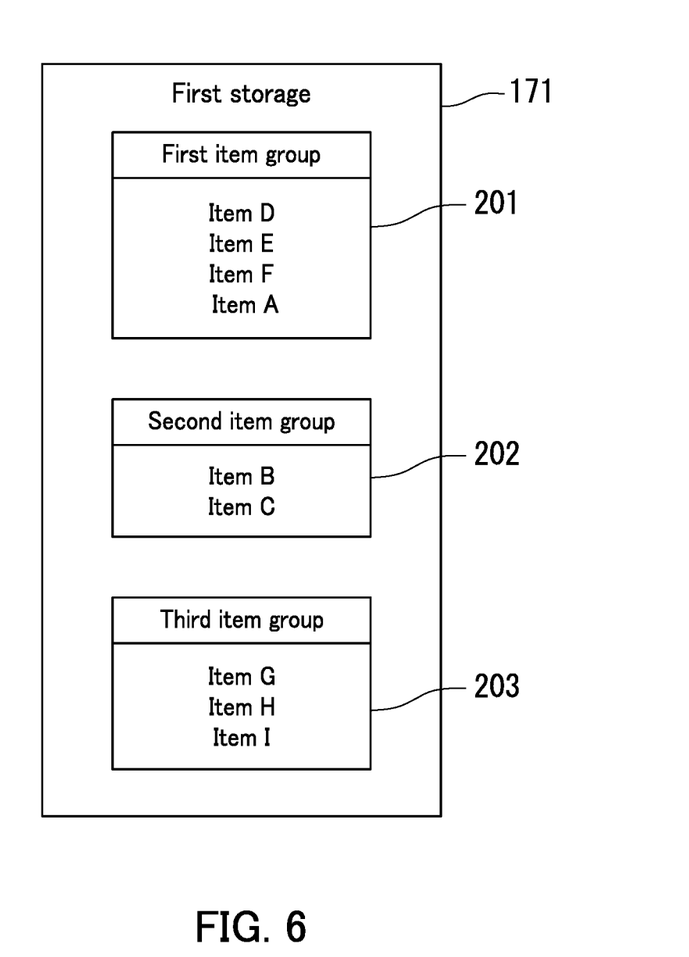
FIG. 6 is a second classification table in which a plurality of items in the first embodiment are classified in a first item group, a second item group, and a third item group.

Next, a classification table changed based on change frequency will be described with reference to FIG. 6. FIG. 6 is a second classification table in which a plurality of items are classified in a first item group, a second item group, and a third item group. The classification section 106 makes a change based on change frequency such that an item classified in the second item group 202 is to be included in the first item group 201 as shown in FIG. 6.

As shown in FIG. 6, item D, item E, item F, and item A are classified in the first item group 201. Also, item B and item C are classified in the second item group 202. Further, item G, item H, and item I are classified in the third item group 203.

Therefore, according to the first embodiment, since a change is made such that item A included in the second item group 202 is included in the first item group 201, the amount of information stored in the second storage 172 can be reduced. As a result, it is possible to reduce the number of items that the service person analyzes at a regular visit. Therefore, the burden on the service person accessing and analyzing the second storage 172 at a regular visit can be reduced.

More specifically, when the change frequency of an item classified in the second item group 202 is reduced to be less than a first threshold, the classification section 106 preferably makes a change such that the item classified in the second item group 202 is to be included in the first item group 201. The first threshold is for example 8 days. As shown in FIG. 4, for example at the time when the second change is made, the arithmetic mean value of the change interval is "3 days", and therefore a change such that an item classified in the second item group 202 is to be included in the first item group 201 is not made. By contrast, at the time when the fifth change is made, the arithmetic mean value of the change interval is "7 days", and therefore a change such that an item classified in the second item group 202 is to be included in the first item group 201 is made. Therefore, according to the first embodiment, when the change frequency of an item classified in the second item group 202 is reduced to be less than the first threshold, the classification section 106 makes a change such that the item classified in the second item group 202 is to be included in the first item group 201. As a result, it is possible to prevent information regarding the item of which the change frequency has been reduced from being stored in the second storage 172. As a result, it is possible to reduce the number of items that the service person analyzes at a regular visit.

Figure 7:
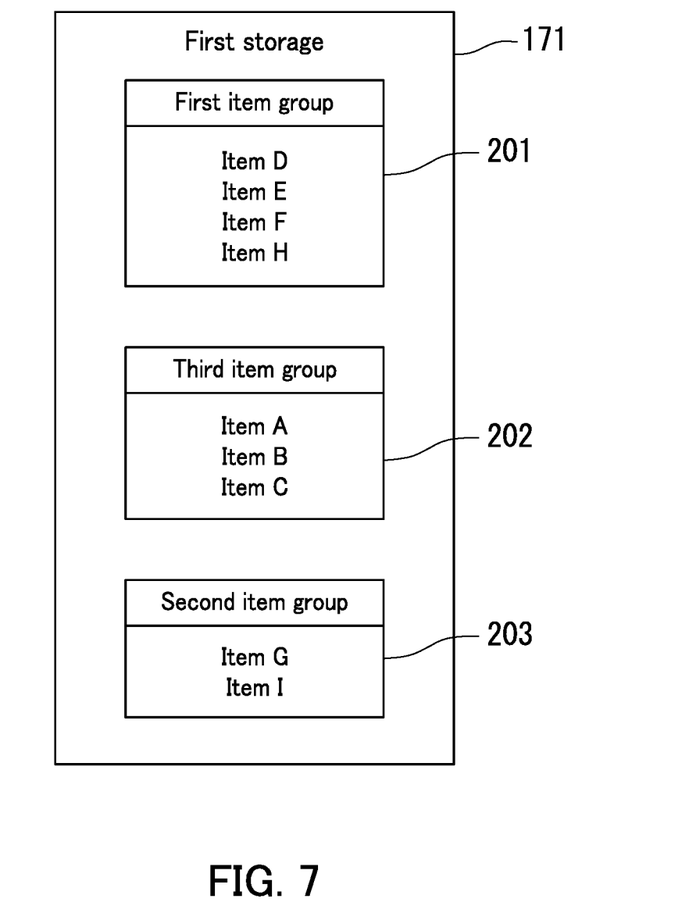
FIG. 7 is a third classification table in which a plurality of items in the first embodiment are classified in a first item group, a second item group, and a third item group.

Next, a classification table changed based on change frequency will be described with reference to FIG. 7. FIG. 7 is a third classification table in which a plurality of items are classified in a first item group, a second item group, and a third item group. The classification section 106 makes a change depending on change frequency such that an item classified in the third item group 203 is to be included in the first item group 201 as shown in FIG. 7.

Item D, item E, and item F are classified in the first item group 201. Also, item A, item B, and item C are classified in the second item group 202. Further, item G, item H, and item I are classified in the third item group 203.

Therefore, according to the first embodiment, a change is made such that an item included in the third item group 203 is to be included in the first item group 201. As a result, the service person can promptly respond to the change in the item content although sending information regarding the item to the server 600 was previously prevented.

Specifically, when the change frequency of an item classified in the third item group 203 is increased to be more than a second threshold, the classification section 106 preferably makes a change such that the item is to be included in the first item group 201. The second threshold is for example 30 days. As shown in FIG. 5, for example at the time when the second change is made, the arithmetic mean value of the change interval is "31 days", and therefore a change such that an item classified in the third item group 203 is to be included in the first item group 201 is not made. By contrast, at the time when the third change is made, the arithmetic mean value of the change interval is "25 days", and therefore a change such that an item classified in the third item group 203 is to be included in the first item group 201 is made. As a result, according to the first embodiment, the service person can find a change in item content although sending information regarding the item to the server 600 was previously prevented. As a result, the service person can promptly respond to the change in the item content although sending information regarding the item to the server 600 was previously prevented.

Figure 8:
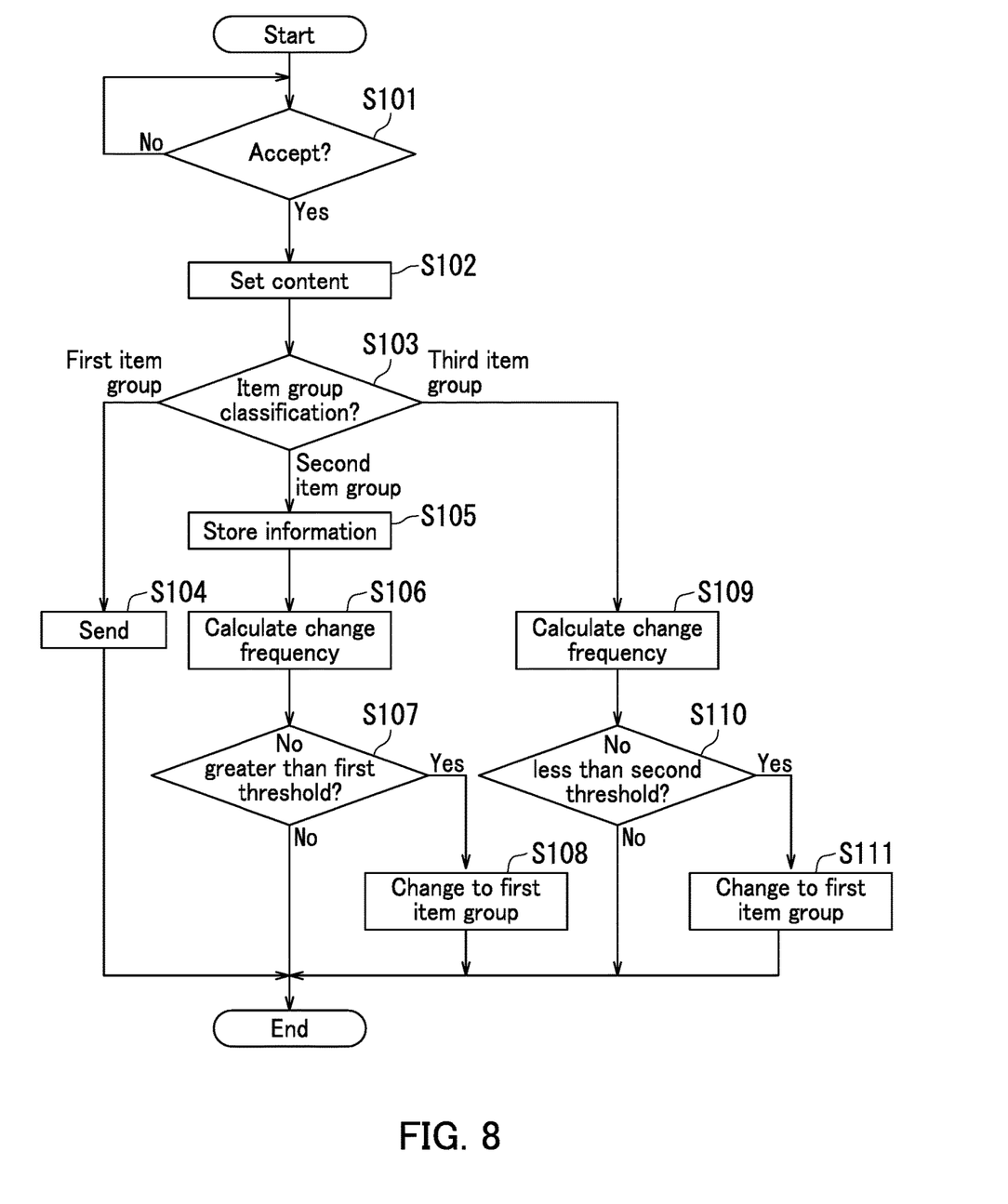
FIG. 8 is a flow chart illustrating a classification method in an image forming apparatus according to the first embodiment.

Next, a classification method in the image forming apparatus 1 according to the first embodiment will be described with reference to FIG. 8. FIG. 8 is a flow chart illustrating the classification method in the image forming apparatus 1 according to the first embodiment. As illustrated in FIG. 8, the classification method includes Steps S101 to S111.

In Step S101, the setting section 101 accepts via the operation section 7 an instruction to set content of an item from the user. Then, the process proceeds to Step S102.

In Step S102, the setting section 101 sets item content for each function. Then, the process proceeds to Step S103.

In Step S103, the determination section 102 determines in which of the first item group 201, the second item group 202, and the third item group 203 the item whose content has been changed is classified. If the determination section 102 determines that the item is included in the first item group 201 (if the item is included in the first item group in Step S103), the process proceeds to Step S104. If the determination section 102 determines that the item is included in the second item group 202 (if the item is included in the second item group in Step S103), the process proceeds to Step S105. If the determination section 102 determines that the item is included in the third item group 203 (if the item is included in the third item group in Step S103), the process proceeds to Step S109.

In Step S104, the first processing section 103 sends information indicating a content change in a specified item to the server 600. The first processing section 103 sends information to the server 600, and the process ends.

In Step S105, the second processing section 104 stores information including changed item content in the second storage 172. Then, the process proceeds to Step S106.

In Step S106, the classification section 106 calculates a change frequency based on change intervals. Then, the process proceeds to Step S107.

In Step S107, the classification section 106 determines whether or not the change frequency is no greater than the first threshold. If the change frequency is greater than the first threshold (No in Step S107), the process ends. If the change frequency is determined to be no greater than the first threshold (Yes in Step S107), the process proceeds to Step S108.

In Step S108, the classification section 106 makes a change such that the item classified in the second item group 202 is to be included in the first item group 201. The classification section 106 makes a change such that the item is to be included in the first item group 201, and the process ends.

In Step S109, the classification section 106 calculates a change frequency based on change intervals. Then, the process proceeds to Step S110.

In Step S110, the classification section 106 determines whether or not the change frequency is no less than the second threshold. If the change frequency is less than the second threshold (No in Step S110), the process ends. If the change frequency is determined to be no less than the second threshold (Yes in Step S110), the process proceeds to Step S111.

In Step S111, the classification section 106 makes a change such that the item classified in the third item group 203 is to be included in the first item group 201. The classification section 106 makes a change such that the item is to be included in the first item group 201, and the process ends.

Second Embodiment

Figure 9:
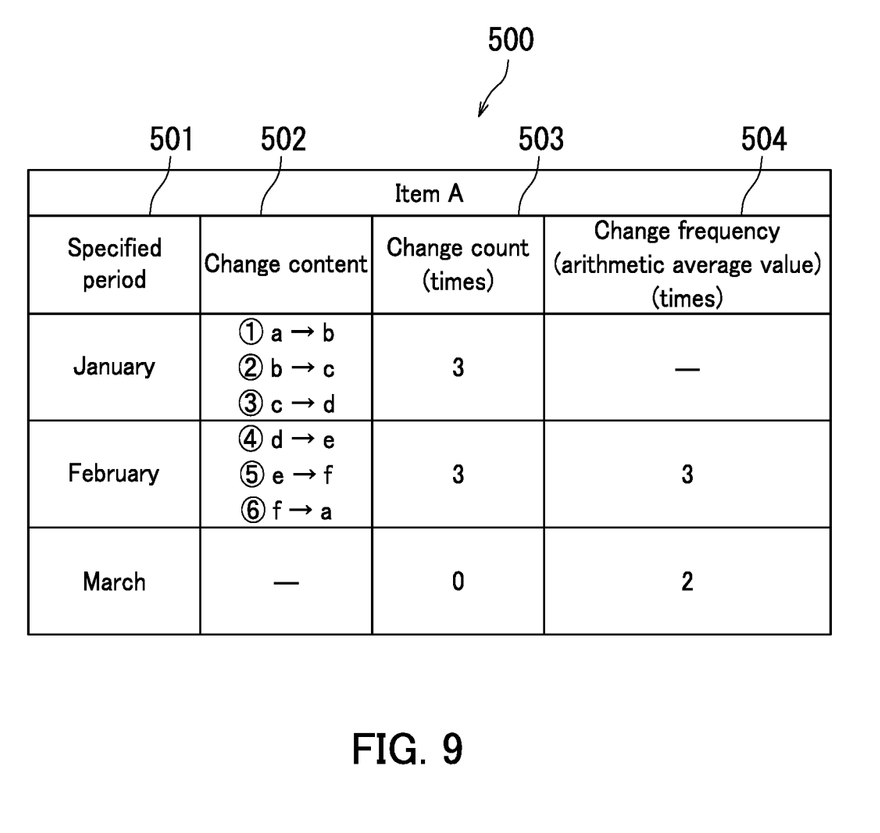
FIG. 9 is a third table including content change history of item A classified in a second item group in a second embodiment.

Next, an image forming apparatus 1 according to a second embodiment will be described with reference to FIG. 9. The second embodiment differs from the first embodiment in that the classification section 106 calculates a change frequency based on count values. A count value indicates a change count of item content within a specified period.

Item A classified in the second item group 202 will be described with reference to FIG. 9. FIG. 9 is a third table 500 including content change history of item A classified in the second item group 202. As illustrated in FIG. 9, information including changed content of item A is represented in a table format. The information including changed content of item A includes a specified period data field 501, a change content data field 502, a change count data field 503, and a change frequency data field 504. The change frequency is represented by for example an arithmetic average value of change intervals.

The specified period data field 501 stores data indicating specified periods. The specified period is for example one month. For example, data indicating "January" and data indicating "February" are stored.

The change content data field 502 stores data indicating the content before the change and the content after the change. For example, in the change content data field for "January", data indicating a change from content "a" to content "b", data indicating a change from content "b" to content "c", and data indicating a change from content "c" to content "d" are stored. Each of "a" to "f" indicates item content different from each other.

The change count data field 503 stores data indicating a count value indicating a change count of item content within a specified period. For example, in the change count data field for "January", data indicating "3 times" is stored. In the change count data field for "February", data indicating "3 times" is stored.

The change frequency data field 504 stores data indicating a change frequency. For example, in the change frequency data field, data indicating an arithmetic average value of count values is stored. In the change frequency data field for "February", data indicating "3 times" is stored. In the change frequency data field for "March", data indicating "twice" is stored.

The classification section 106 calculates a change frequency based on count values. Therefore, according to the second embodiment, the classification section 106 can appropriately calculate a change frequency based on large or small of the count values. For example, calculation by the classification section 106 taking a smaller count value into account results in a reduced change frequency. By contrast, calculation by the classification section 106 taking a larger count value into account results in an increased change frequency.

The change frequency is preferably represented by an average value of a plurality of count values of the item. Therefore, according to the second embodiment, even when there is a prominently small count value or a prominently large count value, it is possible to calculate a change frequency that is less affected by the prominently small count value and the prominently large count value.

Hereinbefore, embodiments of the present disclosure have been described with reference to the drawings. However, the present disclosure is not limited to the above embodiments and may be implemented in various different forms that do not deviate from the essence of the present disclosure. The drawings schematically illustrate elements of configuration in order to facilitate understanding, and properties of elements of configuration illustrated in the drawings, such as thicknesses, lengths, and numbers thereof, may differ from actual properties thereof in order to facilitate preparation of the drawings. Shapes, dimensions, and the like of the elements of configuration given in the above embodiment are merely examples that do not impose any particular limitations and may be altered in various ways so long as such alterations do not substantially deviate from the configuration of the present disclosure.

(1) As described with reference to FIGS. 1 to 9, the change frequency is represented by an arithmetic average value of change intervals in the embodiments of the present disclosure. However, the present disclosure is not limited thereto. The change frequency may be represented by a geometric mean value of change intervals of the item, a harmonic mean value of change intervals, or a moving average value of change intervals. Also, the change frequency may be represented by an arithmetic average value of count values, a geometric mean value of count values, a harmonic mean value of count values, or a moving average value of count values.

(2) As described with reference to FIGS. 1 to 9, the classification section 106 makes a change depending on change frequency such that an item classified in the second item group 202 or the third item group 203 is to be included in the first item group 201 in the embodiments of the present disclosure. However, the present disclosure is not limited thereto. The classification section 106 may make a change depending on change frequency of the item content such that an item classified in a first item group 201 is to be included in the second item group 202 or the third item group 203.

What is claimed is:

1. An image forming apparatus having items relating to control of a function, the apparatus comprising:
   a setting section configured to set content of the item for the function; and
   a classification section configured to classify the item into a first item group depending on a change frequency of the content of the item, wherein
   the first item group is a group defined such that information indicating a change in the content of the item is sent to an external device.

2. The image forming apparatus according to claim 1, further comprising
   storage, wherein
   some of the items are classified in a second item group,
   the second item group is a group defined such that information including changed item content is stored in the storage, and
   the classification section makes a change depending on the change frequency such that the item classified in the second item group is to be included in the first item group.

3. The image forming apparatus according to claim 2, wherein
   when the change frequency is reduced to be less than a first threshold, the classification section makes a change such that the item classified in the second item group is to be included in the first item group.

4. The image forming apparatus according to claim 1, further comprising
   storage, wherein
   some of the items are classified in a third item group, the third item group is a group defined such that storing information indicating change content of an item in the storage and sending the information indicating a change in the content of the item to the external device are prevented, and the classification section makes a change depending on the change frequency such that the item classified in the third item group is to be included in the first item group.

5. The image forming apparatus according to claim 4, wherein when the change frequency is increased to be more than a second threshold, the classification section makes a change such that the item classified in the third item group is to be included in the first item group.

6. The image forming apparatus according to claim 1, further comprising storage, wherein some of the items are classified in a second item group, some other of the items are classified in a third item group, the second item group is a group defined such that information including changed item content is stored in the storage, the third item group is a group defined such that storing information indicating change content of an item in the storage and sending the information indicating a change in the content of the item to the external device are prevented, and the classification section makes a change depending on the change frequency such that the item classified in the second item group or the third item group is to be included in the first item group.

7. The image forming apparatus according to claim 1, wherein the classification section calculates the change frequency based on change intervals each between a change made in the content of the item and a next change.

8. The image forming apparatus according to claim 7, wherein the change frequency is represented by an average value of the change intervals of the item.

9. The image forming apparatus according to claim 1, wherein the classification section calculates the change frequency based on count values each indicating a change count of the content of the item within a specified period.

10. The image forming apparatus according to claim 9, wherein the change frequency is represented by an average value of the count values of the item.

\* \* \* \* \*